(12) United States Patent
Suzuki

(10) Patent No.: US 8,287,773 B2
(45) Date of Patent: Oct. 16, 2012

(54) METHOD FOR PRODUCING ACTIVE MATERIAL AND ELECTRODE, ACTIVE MATERIAL, AND ELECTRODE

(75) Inventor: Hisashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 303 days.

(21) Appl. No.: 12/689,540

(22) Filed: Jan. 19, 2010

(65) Prior Publication Data
US 2010/0181540 A1    Jul. 22, 2010

(30) Foreign Application Priority Data

Jan. 20, 2009 (JP) ................ P2009-010415

(51) Int. Cl.
*H01B 1/02* (2006.01)
(52) U.S. Cl. ............... 252/520.22; 252/182.1; 252/500; 252/520.2; 148/247; 428/404; 428/450; 429/218.1; 429/220; 429/326; 429/231.1; 429/232
(58) Field of Classification Search ............ 252/500, 252/182.1, 520.2, 520.22; 148/247; 428/404, 428/450; 429/231.3, 232, 218.1, 220, 326
See application file for complete search history.

(56) References Cited

U.S. PATENT DOCUMENTS

| | | | |
|---|---|---|---|
| 5,856,009 A | 1/1999 | Nishio et al. | |
| 6,106,966 A | 8/2000 | Crow | |
| 6,395,426 B1 | 5/2002 | Imachi et al. | |
| 6,730,435 B1 | 5/2004 | Nakane et al. | |
| 2002/0012804 A1* | 1/2002 | Heimann et al. | 428/450 |
| 2002/0127473 A1* | 9/2002 | Ooya et al. | 429/232 |
| 2006/0007629 A1 | 1/2006 | Takeda et al. | |
| 2006/0057466 A1 | 3/2006 | Suhara et al. | |
| 2006/0071198 A1* | 4/2006 | Paulsen et al. | 252/500 |
| 2006/0166100 A1 | 7/2006 | Takahashi et al. | |
| 2006/0185769 A1* | 8/2006 | Nakayama et al. | 148/247 |
| 2006/0263690 A1* | 11/2006 | Suhara et al. | 429/231.3 |
| 2007/0224506 A1* | 9/2007 | Ooyama et al. | 429/231.3 |
| 2008/0044727 A1 | 2/2008 | Suzuki et al. | |
| 2008/0113271 A1 | 5/2008 | Ueda et al. | |
| 2009/0226725 A1* | 9/2009 | Myeong et al. | 428/404 |

FOREIGN PATENT DOCUMENTS

| | | |
|---|---|---|
| CN | 1294417 A | 5/2001 |
| CN | 1726304 A | 1/2006 |
| CN | 101127399 A | 2/2008 |
| CN | 101258264 A | 9/2008 |

(Continued)

OTHER PUBLICATIONS

English Translation of Chinese Office Action dated Nov. 12, 2010 in Chinese Patent Application Publication No. 200810146776.9.

(Continued)

*Primary Examiner* — Khanh Tuan Nguyen
(74) *Attorney, Agent, or Firm* — Oliff & Berridge, PLC

(57) ABSTRACT

The method for producing an active material according to the invention comprises a step of contacting an aqueous solution containing a zirconium fluoro-complex and a silicon fluoro-complex with a first metal oxide particle to form a second metal oxide particle group containing a zirconium oxide particle and a silicon oxide particle on the surface of the first metal oxide particle. The active material comprises a first metal oxide particle and a second metal oxide particle group formed on the surface of the first metal oxide particle, and the second metal oxide particle group contains a zirconium oxide particle and a silicon oxide particle.

3 Claims, 9 Drawing Sheets

FOREIGN PATENT DOCUMENTS

| | | | |
|---|---|---|---|
| JP | A-4-319260 | | 11/1992 |
| JP | A-7-288127 | | 10/1995 |
| JP | A-2000-200605 | | 7/2000 |
| JP | A 2002-248163 | | 9/2002 |
| JP | 2005-078800 | * | 3/2005 |
| JP | A-2005-85635 | | 3/2005 |
| JP | A-2005-276454 | | 10/2005 |
| JP | A-2006-107763 | | 4/2006 |
| KR | 10-2004-096203 | * | 11/2004 |
| WO | WO 2004/030126 A1 | | 4/2004 |
| WO | WO 2005/028371 A1 | | 3/2005 |
| WO | WO 2005/119820 A1 | | 12/2005 |
| WO | WO 2007/029933 | * | 3/2007 |

OTHER PUBLICATIONS

Cho, J. et al. "Zero-Strain Intercalation Cathode for Rechargeable Li-Ion Cell," Angewandte Chemie International Edition, 40: 3367-3369 (2001).

Seung-Taek Myung et al. "Role of Alumina Coating on Li—Ni—Co—Mn—O Particles as Positive Electrode Material for Lithium-Ion Batteries," Chemistry of Materials 17 (14), 3695-3704 (2005).

Myung, S. et al. "Functionality of Oxide Coating for Li[Li$_{0.05}$Ni$_{0.4}$Co$_{0.15}$Mn$_{0.4}$]O$_2$ as Positive Electrode Materials for Lithium-Ion Secondary Batteries," The Journal of Physical Chemistry C, 111 (10), 4061-4067 (2007).

Dictionary of Geology and Mineralogy (2$^{nd}$ Edition), McGraw-Hill, p. 33 (2003).

Patnaik, Pradyot, Handbook of Organic Chemicals, McGraw-Hill, p. 1001 (2003).

Office Action issued May 12, 2011 in copending U.S. Appl. No. 12/204,340.

Office Action issued Nov. 25, 2011 in copending U.S. Appl. No. 12/204,340.

Office Action issued Feb. 15, 2012 in copending U.S. Appl. No. 12/787,496.

U.S. Appl. No. 12/204,340.

U.S. Appl. No. 12/787,496.

Chen et al., "Studies of LiCoO$_2$ Coated with Metal Oxides," 2003, Electrochemical and Solid-State Letters, pp. A221-A224, vol. 6, No. 11, The Electrochemical Society, Inc., Canada.

Chen et al., "Methods to obtain excellent capacity retention in LiCoO$_2$ cycled to 4.5 V," 2004, Electrochemica Acta, pp. 1079-1090, vol. 49, Elsevier Ltd., Canada.

Kannan et al., "High Capacity Surface-Modified LiCoO$_2$ Cathodes for Lithium-Ion Batteries," 2003, Electrochemical and Solid-State Letters, pp. A16-A18, vol. 6, No. 1, The Electrochemical Society, Inc., USA.

Jun. 14, 2012 Office Action issued in U.S. Appl. No. 12/204,340.
Jul. 19, 2012 Office Action issued in U.S. Appl. No. 12/787,496.

* cited by examiner (a)

(b)

METHOD FOR PRODUCING ACTIVE MATERIAL AND ELECTRODE, ACTIVE MATERIAL, AND ELECTRODE

BACKGROUND OF THE INVENTION

1. Field of the Invention

The present invention relates to a method for producing an active material and electrode employed in rechargeable electrochemical devices such as a lithium ion secondary battery and an electrical double layer capacitor (EDLC), and to an active material and electrode produced by the method.

2. Related Background Art

Rechargeable electrochemical devices such as lithium ion secondary batteries and electrical double layer capacitors are widely used in cellular phones, laptop computers, PDAs and the like. The main positive electrode active materials used in lithium ion secondary batteries are metal oxides such as $LiCoO_2$, $LiNi_xCO_{1-x}O_2$, $LiMn_2O_4$, $LiCO_xNi_yMn_{1-x-y}O_2$ and $LiCO_xNi_yAl_{1-x-y}O_2$, and much research is being conducted on metal oxide particles with the aim of achieving further improved cell characteristics (see Patent documents 1-6 and Non-patent documents 1-3, for example).

[Patent document 1] Japanese Unexamined Patent Publication HEI No. 07-288127
[Patent document 2] Japanese Unexamined Patent Publication HEI No. 04-319260
[Patent document 3] Japanese Unexamined Patent Publication No. 2005-85635
[Patent document 4] Japanese Unexamined Patent Publication No. 2000-200605
[Patent document 5] Japanese Unexamined Patent Publication No. 2006-107763
[Patent document 6] Japanese Unexamined Patent Publication No. 2005-276454
[Non-patent document 1] Electrochemical and Solid-State Letters, 6(11)A221-A224 (2003)
[Non-patent document 2] Electrochimica Acta 49 (2004) 1079-1090
[Non-patent document 3] Electrochemical and Solid-State Letters, 6(1)A16-A18 (2003)

SUMMARY OF THE INVENTION

With conventional metal oxide particles, however, the particles sometimes aggregate together and it has not been possible to obtain satisfactory cycle characteristics as an active material. A demand therefore exists for an active material that can further improve cycle characteristics, and a method for producing it.

The present invention has been accomplished in light of this problem, and its object is to provide a method for producing an active material and electrode employing a metal oxide with satisfactory cycle characteristics, as well as an active material and electrode.

In the context described above, the present inventors discovered that an active material with improved cycle characteristics over the prior art can be obtained by using a specific method to form a zirconium oxide and silicon oxide (hereinafter also referred to as "second metal oxide") particle group on the surface of particle of a metal oxide as the active material (hereinafter also referred to as "first metal oxide"). The method comprises a step of immersing the first metal oxide particle in an aqueous solution containing a zirconium fluoro-complex and a silicon fluoro-complex, and if necessary adding a chemical substance known as a scavenger to shift the equilibrium of chemical formula (I) below toward the right. This method is called liquid phase deposition (LPD).

$$MF_x^{(x-2n)-}+nH_2O=MO_n+xF^-+2nH^+ \quad (1)$$

(Here, M=Zr, Si.)

$$H_3BO_3+4H^++4F^-=HBF_4+3H_2O \quad (2)$$

$$Al+6H^++6F^-=H_3AlF_6+3/2H_2 \quad (3)$$

The scavenger used may be boric acid ($H_3BO_3$), aluminum (Al) or the like. Boric acid reacts with fluoride ion according to equation (2), to form $HBF_4$. Consumption of fluoride ion causes the equilibrium of equation (1) to shift toward the right, promoting production of $MO_n$ as the second metal oxide. Al also reacts with the fluoride ion as represented by equation (3), yielding $H_3AlF_6$. As a result, the equilibrium in equation (1) shifts toward production of $MO_n$ as the second metal oxide.

The method for producing an active material according to the invention comprises a step of contacting an aqueous solution containing a zirconium fluoro-complex and a silicon fluoro-complex with a first metal oxide particle to form a second metal oxide particle group containing a zirconium oxide particle and a silicon oxide particle on the surface of the first metal oxide particle.

The method for producing an electrode according to the invention comprises a step of contacting an aqueous solution containing a zirconium fluoro-complex and a silicon fluoro-complex with an electrode provided with an active material layer containing a first metal oxide particle, a conductive aid and a binder, to form a second metal oxide particle group containing a zirconium oxide particle and a silicon oxide particle on the surface of the first metal oxide particle.

An electrochemical device employing an active material and electrode obtained according to the invention improves cycle characteristics compared to the prior art. The reason for this is not entirely clear, but the following is a possible factor. By contacting an aqueous solution containing a zirconium fluoro-complex and a silicon fluoro-complex with the first metal oxide particle according to the invention, not a complex oxide particle group containing zirconium and silicon but a particle group containing a zirconium oxide particle and a silicon oxide particle is formed on the surface of the first metal oxide particle. Thus, aggregation of zirconium oxide particles and silicon oxide particles is inhibited, and it is possible to uniformly cover the surface of the first metal oxide particle with the second metal oxide particle group. It is believed that this improves the cycle characteristics.

The active material of the invention comprises a first metal oxide particle and a second metal oxide particle group formed on the surface of the first metal oxide particle, and the second metal oxide particle group contains a zirconium oxide particle and a silicon oxide particle. The active material of the invention may also have the second metal oxide particle group forming a layer on the surface of the first metal oxide particle. The thickness of the layer is preferably 1-200 nm. The second metal oxide layer may be either laminar or particulate. The electrode of the invention comprises an active material as described above.

Such an active material can be easily produced by the method described above, and an electrochemical device employing the active material and electrode improves cycle characteristics compared to the prior art.

According to the invention there are provided a method for producing an active material and electrode employing a metal oxide with sufficient cycle characteristics, as well as an active material and an electrode.

DESCRIPTION OF THE PREFERRED EMBODIMENTS

Figure 1:
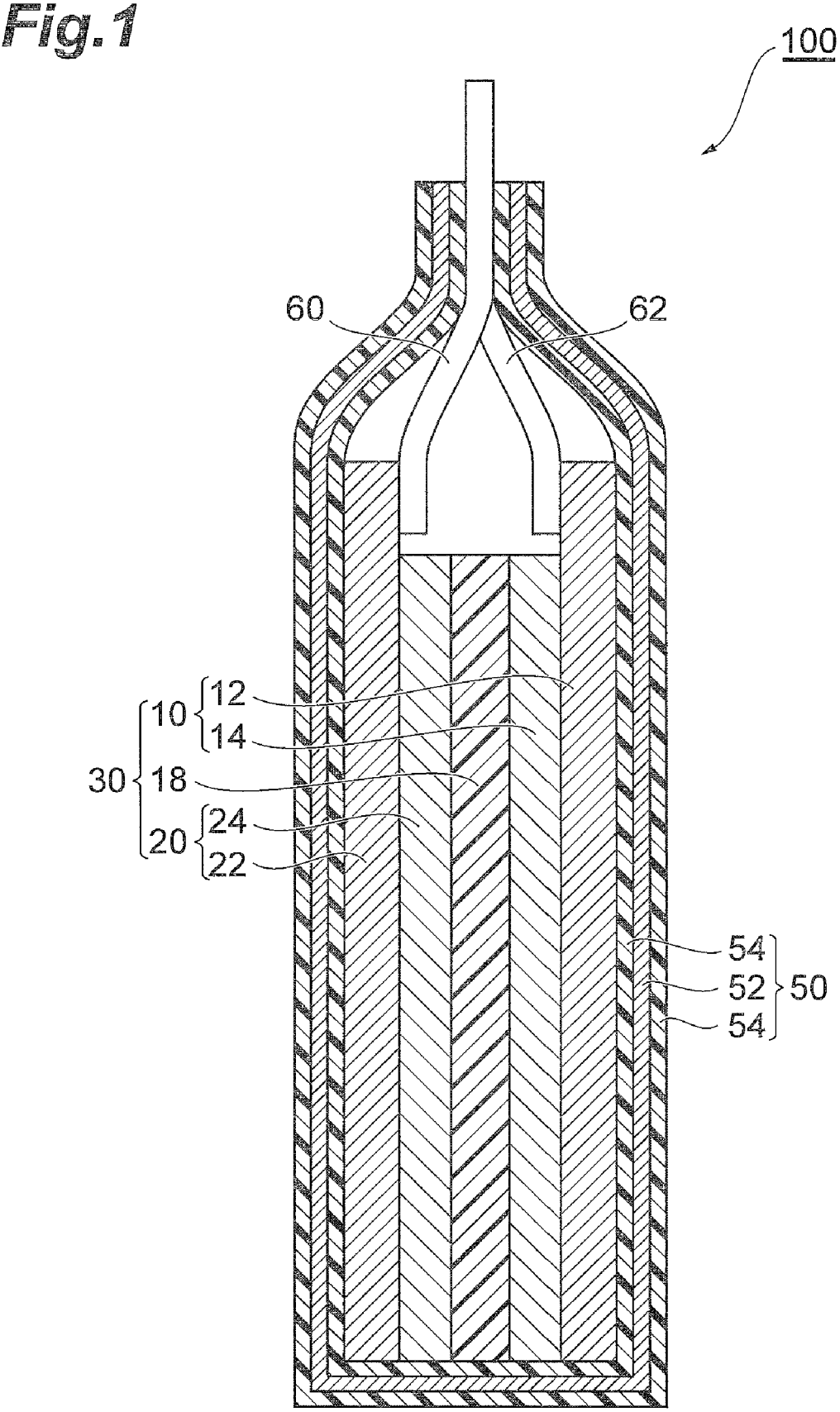
FIG. 1 is a simplified cross-sectional view showing a lithium ion secondary battery according to a first embodiment.

Preferred embodiments of the invention will now be explained in detail, with reference to the accompanying drawings. In the following explanations, identical or equivalent constituents will be referred to with the same reference signs while omitting their overlapping descriptions. Also, the dimensional proportions in the drawings do not necessarily match the actual dimensional proportions.

(Electrochemical Device)

First, a lithium ion secondary battery as an electrochemical device employing an active material and electrode according to the invention will be explained briefly with reference to FIG. 1.

The lithium ion secondary battery 100 comprises, primarily, a laminated body 30, a case 50 housing the laminated body 30 in a sealed state, and a pair of leads 60, 62 connected to the laminated body 30.

The laminated body 30 has the pair of electrodes 10, 20 laid facing each other across a separator 18. The positive electrode 10 has a positive electrode active material layer 14 formed on a positive electrode collector 12. The negative electrode 20 has a negative electrode active material layer 24 formed on a negative electrode collector 22. The positive electrode active material layer 14 and negative electrode active material layer 24 contact with either side of the separator 18. Leads 60, 62 are connected at the ends of the positive electrode collector 12 and negative electrode collector 22, and the ends of the leads 60, 62 extend out of the case 50.

(First Embodiment)
(Positive Electrode and Method for Producing it)
The first embodiment of the invention will now be described. In the first embodiment, a positive electrode active material having the second metal oxide particle group formed on the surface of the first metal oxide particles is formed, and this surface-modified positive electrode active material is used to fabricate a positive electrode.

(Method for Producing Positive Electrode Active Material)
First, the first metal oxide particles are prepared. The first metal oxide is not particularly restricted so long as it functions as a positive electrode active material, but a lithium-containing metal oxide is preferred as the first metal oxide. Among lithium-containing metal oxides there are preferred metal oxides containing one or more metals selected from the group consisting of Li, Co, Ni, Mn and Al, such as $LiMn_2O_4$, $LiMn_{2-x}Al_xO_4$ (where x is greater than 0 and less than 2), $LiMO_2$ (where M represents Co, Ni or Mn), $LiCo_xNi_{1-x}O_2$, $LiCo_xNi_yMn_{1-x-y}O_2$ (where x and y are greater than 0 and less than 1) and $LiNi_xCo_yAl_{1-x-y}O_2$ (where x and y are greater than 0 and less than 1). $LiNi_{1/3}Mn_{1/3}CO_{1/3}O_2$ and $LiNi_{0.8}CO_{0.15}Al_{0.05}$ are particularly preferred. $Li_4Ti_5O_{12}$ is also preferred.

There are no particular restrictions on the particle size of the first metal oxide particles, but it is preferably about 0.5-30 μm.

The specific surface area of the first metal oxide particles is preferably 0.1-2.0 $m^2/g$. If the specific surface area is less than 0.1 $m^2/g$ the rate property will tend to be poor, and if it exceeds 2.0 $m^2/g$ the safety will tend to be lower. The specific surface area of the first metal oxide particles may be measured by gas adsorption method using the specific surface area/pore distribution measuring apparatus, NOVA1200, by Yuasa-Ionics, Inc.

Next, an aqueous solution containing a zirconium fluoro-complex and silicon fluoro-complex is prepared as a metal fluoro-complex.

As specific examples of zirconium fluoro-complexes there may be mentioned hexafluorozirconic acid ($H_2ZrF_6$) or salts thereof, and as specific examples of silicon fluoro-complexes there may be mentioned hexafluorosilicic acid ($H_2SiF_6$) or salts thereof.

As salts of hexafluorozirconic acid and hexafluorosilicic acid there may be mentioned potassium salts, calcium salts and ammonium salts, such as $K_2ZrF_6$, $K_2SiF_6$, $CaZrF_6$, $CaSiF_6$, $(NH_4)_2ZrF_6$, $(NH_4)_2SiF_6$ and the like.

Such metal fluoro-complexes can be obtained, for example, by dissolving non-fluoro-complex metal compounds in hydrofluoric acid (HF) aqueous solution, ammonium hydrogenfluoride ($NH_4F \cdot HF$) aqueous solution, ammonium fluoride ($NH_4F$) aqueous solution, or the like. When $ZrO_2$ or $SiO_2$ is dissolved in $NH_4F \cdot HF$ aqueous solution, for example, it becomes a metal fluoro-complex such as $ZrF_6^{2-}$ or $SiF_6^{2-}$ in the aqueous solution, and can thus be utilized for the invention.

The concentration of the metal fluoro-complex in the aqueous solution is limited by the solubility of the metal fluoro-complex in water, but that of a zirconium fluoro-complex is preferably 0.001-0.06 M while that of a silicon fluoro-complex is preferably 0.001-0.8 M. Here, M=mol/L.

The aqueous solution may also contain a scavenger that can withdraw fluoride ion ($F^-$) from the metal fluoro-complex. Addition of a scavenger can accelerate surface modification. When the surface modification speed is sufficiently high due to the type of metal fluoro-complex, it may not be necessary to use a scavenger.

As scavengers there may be mentioned boric acid ($H_3BO_3$), aluminum (Al), ferrous chloride ($FeCl_2$), ferric chloride ($FeCl_3$), sodium hydroxide (NaOH), ammonia ($NH_3$), titanium (Ti), iron (Fe), nickel (Ni), magnesium (Mg), copper (Cu), zinc (Zn), silicon (Si), silicon dioxide ($SiO_2$), calcium oxide (CaO), bismuth oxide ($Bi_2O_3$), aluminum oxide ($Al_2O_3$), magnesium oxide (MgO) and the like, among which boric acid is preferred.

When boric acid is used, the concentration of boric acid is limited by the solubility of boric acid in water, but it is preferably about 0.001-1 M in the treatment solution.

Next, the first metal oxide particles are contacted with an aqueous solution containing a zirconium fluoro-complex and silicon fluoro-complex as a metal fluoro-complex. Specifically, the first metal oxide particles may be loaded into an aqueous solution containing the metal fluoro-complex, and stirred if necessary. Alternatively, instead of mixing the metal fluoro-complex aqueous solution and boric acid together from the beginning, the first metal oxide particles may be dispersed in the boric acid aqueous solution and the metal fluoro-complex aqueous solution added dropwise thereto. When no scavenger is used, the first metal oxide particles may be dispersed in water and the metal fluoro-complex aqueous solution added dropwise thereto.

In the aqueous solution, the following equilibrium reaction:

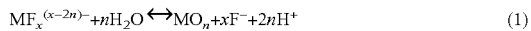
$$MF_x^{(x-2n)-} + nH_2O \leftrightarrow MO_n + xF^- + 2nH^+ \qquad (1)$$

(where M=Zr, Si)
is established, and the presence of $H_3BO_3$ or Al as a scavenger causes the following reactions:

$$H_3BO_3 + 4H^+ + 4F^- = HBF_4 + 3H_2O \qquad (2)$$

$$Al + 6H^+ + 6F^- = H_3AlF_6 + 3/2H_2 \qquad (3),$$

shifting the equilibrium of formula (1) to the right.

Specifically, boric acid reacts with fluoride ion according to equation (2), to form $HBF_4$. As fluoride ion is consumed, the equilibrium of equation (1) shifts toward the right, promoting production of the second metal oxide $MO_n$. Al also reacts with the fluoride ion as represented by equation (3), yielding $H_3AlF_6$. As a result, the equilibrium in equation (1) shifts toward production of the second metal oxide $MO_n$. It may not be necessary to use a scavenger if the reaction rate of formula (I) is sufficiently high due to the type of metal fluoro-complex, or if the first metal oxide or the produced second metal oxide functions as a scavenger itself.

Figure 2:
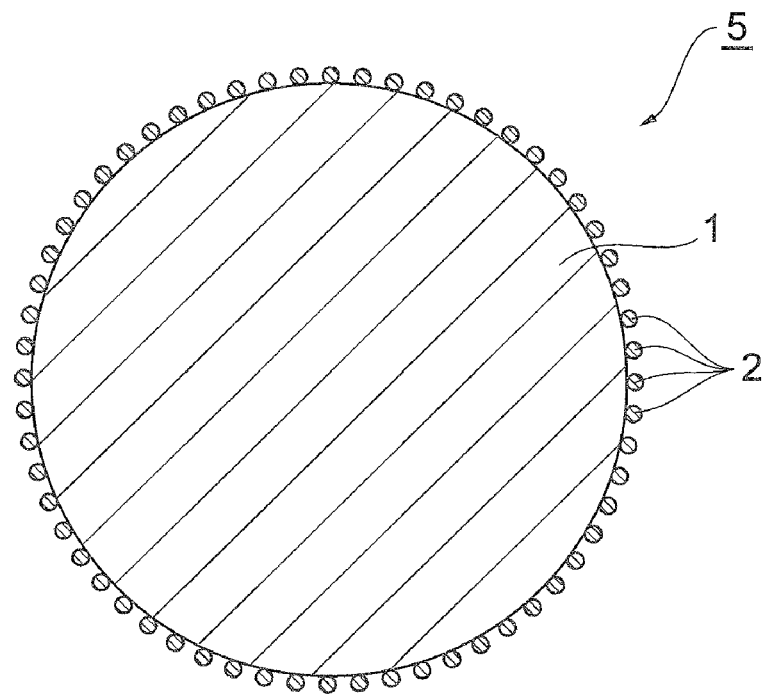
FIG. 2 is a simplified cross-sectional view of an active material according to the first embodiment.
Figure 2:
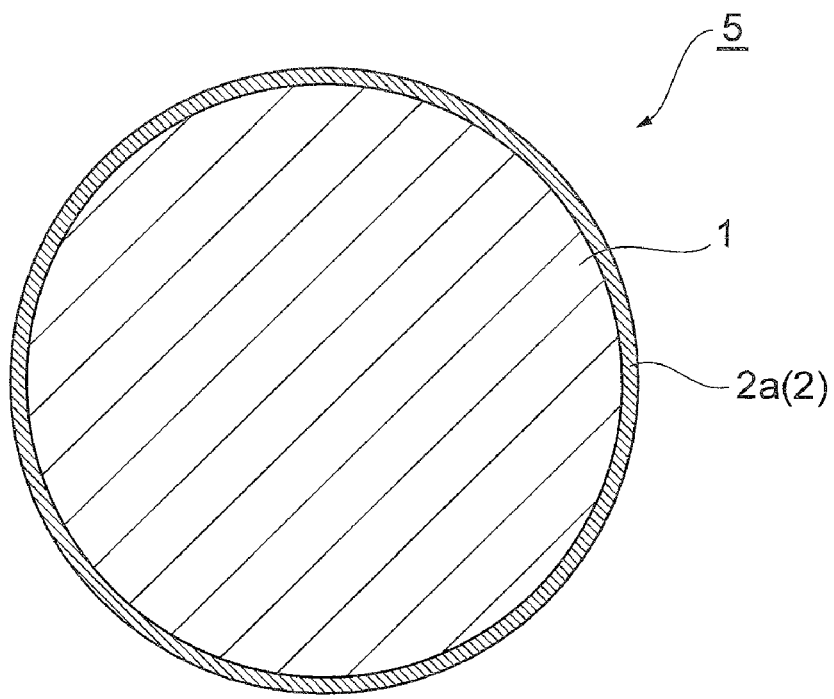

That is, the treatment yields an active material 5 comprising second metal oxide particle groups 2 formed on the surfaces of the first metal oxide particles 1, as shown in FIG. 2(a). The second metal oxide particle groups 2 comprise zirconium oxide particles and silicon oxide particles, with virtually no "complex oxides" containing zirconium and silicon. The second metal oxide differs from the first metal oxide in that it is a metal oxide derived from a metal fluoro-complex.

The second metal oxide particle groups 2 may further contain metal oxide particles such as titanium oxide, zinc oxide, copper oxide, indium oxide, tin oxide, magnesium oxide or aluminum oxide, so long as they contain zirconium oxide particles and silicon oxide particles. In this case, the metal oxide particles such as titanium oxide may be formed on the active material 5 on which the second metal oxide particle groups 2 have been formed, and an aqueous solution containing a titanium fluoro-complex, zinc fluoro-complex, copper fluoro-complex, indium fluoro-complex, tin fluoro-complex, magnesium fluoro-complex, aluminum fluoro-complex or the like may be used to form the metal oxide particles. Specifically, there may be used hexafluorotitanic acid ($H_2TiF_6$) or salts thereof (potassium salts, calcium salts or ammonium salts), zinc fluoride ($ZnF_2$), copper fluoride ($CuF_2$), indium fluoride ($InF_3$), tin fluoride ($SnF_2$, $SnF_4$), magnesium fluoride ($MgF_2$), aluminum fluoride ($AlF_3$) and the like.

F and/or B may also be present in the second metal oxide particle groups 2. For example, the concentration of F in the entire active material (first metal oxide particles+second metal oxide particle groups) may be 50-1000 ppm by mass, and the concentration of B may be 10-1000 ppm by mass.

In the second metal oxide particle groups 2, a mean particle size of the zirconium oxide particles is preferably not greater than 100 nm, and a mean particle size of the silicon oxide particles is preferably not greater than 100 nm. The mean particle size of the zirconium oxide particles of not greater than 100 nm or the mean particle size of the silicon oxide particles of not greater than 100 nm will tend to more easily produce the effect of improved cycle characteristics. The particle size of the zirconium oxide and silicon oxide particles is the diameter in the direction along the surface of the first metal oxide particles, and not the diameter in the thickness direction. The diameters can be easily measured based on a high-resolution electron microscope cross-sectional photograph, and the mean particle size can be easily determined by taking the number average.

The mass ratio of the second metal oxide particle groups 2 with respect to the total mass of the first metal oxide particles 1 and the second metal oxide particle groups 2 is preferably 0.1-5% by mass. If the mass ratio of the second metal oxide particle group is less than 0.1% by mass the effect of improved cycle characteristics will not be easily obtained, and if it exceeds 5% by mass the battery capacity will tend to be smaller.

The mass ratio of the zirconium oxide particles with respect to the total mass of the zirconium oxide particles and silicon oxide particles in the second metal oxide particle groups 2 is preferably 11-90%. If the mass ratio of the zirconium oxide particles is less than 11% the silicon oxide will tend to aggregate during heat treatment, and if it exceeds 90% the zirconium oxide will tend to aggregate during heat treatment.

The second metal oxide particle groups 2 will usually be partially adhering to the surface of the first metal oxide particles 1 as shown in FIG. 2(a), but in some cases a layer 2a will be formed by the second metal oxide particle groups 2 on the surface of the first metal oxide particles 1, as shown in FIG. 2(b). The layer 2a comprises zirconium oxide particles and silicon oxide particles, with virtually no "complex oxides" containing zirconium and silicon. The thickness of the layer 2a in such cases is not particularly restricted, but for example, it is preferably 1-200 nm and more preferably 10-100 nm. If the thickness is less than 1 nm the effect of improved cycle characteristics will not be easily obtained, and if it exceeds 200 nm the positive electrode battery capacity will tend to be smaller.

The mean particle size of the zirconium oxide particles and silicon oxide particles, the mass ratio of the second metal oxide particle groups 2 with respect to the total mass of the first metal oxide particles 1 and second metal oxide particle groups 2, the mass ratio of zirconium oxide particles with respect to the total mass of the zirconium oxide particles and silicon oxide particles, the presence of formation of the layer 2a, and the thickness of the layer 2a, can be easily controlled by setting appropriate values for the mass of the first metal oxide, the pH of the aqueous solution, the time and temperature for contact between the first metal oxide particles 1 and aqueous solution, and the concentration of the metal fluoro-complex or scavenger.

The temperature of the aqueous solution is preferably 10-80° C. A temperature of below 10° C. will tend to lower the rate of deposition of the second metal oxide particle groups 2 on the first metal oxide particles 1, while a temperature of above 80° C. will tend to increase the particle size of the second metal oxide particles.

The pH of the aqueous solution used to form the second metal oxide particle groups 2 is preferably 3-12. The pH of the aqueous solution will usually vary depending on, for example, production of $H^+$ by equation (1) while the particle groups are being formed. A pH of lower than 3 may result in dissolution of the first metal oxide, while a pH of higher than 12 may result in conversion of the metal ions of the metal fluoro-complex to hydroxides in the aqueous solution, resulting in precipitation. Thus, by keeping the aqueous solution pH at 3-12 during formation of the particle group, it is possible to suitably form the second metal oxide particle groups 2 on the first metal oxide particles 1. In order to keep the pH of the aqueous solution within the above-mentioned range while the particle groups are being formed, the pH of the aqueous solution before the particle groups are formed may be pre-specified in consideration of the range of pH variation, so that the pH after the particle groups have been formed is within the above-mentioned range, or an acid (hydrochloric acid or the like) or base (ammonia water or the like) may be added while the particle groups are being formed.

After the active material 5 for the cell having the second metal oxide particle groups 2 formed on the surface of the first metal oxide particles 1 has been obtained by this treatment, it may be filtered, the aqueous solution and active material 5 separated, and the active material 5 washed with water or the like, and then dried. It may also be subjected to heat treatment if necessary. This will increase the crystallinity of the second metal oxide. By increasing the crystallinity of the second metal oxide it is possible to further improve the cycle characteristics by inhibition of decomposition of the electrolyte solution on the surface of the first metal oxide particles 1.

The heat treatment temperature is not particularly restricted but is preferably 500-900° C. This can satisfactorily produce a single crystal of the second metal oxide particle groups 2. There are no particular restrictions on the heat treatment atmosphere as well, but it is preferably an air atmosphere. Single crystal formation will help to further improve the cycle characteristics.

(Method for Producing Positive Electrode)

The active material 5 is used next to fabricate a positive electrode 10. First, a positive electrode collector 12, a binder, and a conductive aid are prepared.

The binder is not particularly restricted so long as it can bind the cell active material and conductive aid to the collector, and any publicly known binder may be used. As examples of binders there may be mentioned fluorine resins such as polyvinylidene fluoride (PVDF) and polytetrafluoroethylene (PTFE), and mixtures of styrene-butadiene rubber (SBR) with water-soluble polymers (carboxymethylcellulose, polyvinyl alcohol, sodium polyacrylate, dextrin, gluten and the like).

The positive electrode collector 12 may be an aluminum foil.

As examples of conductive aids there may be mentioned carbon materials such as carbon black, metal powder such as copper, nickel, stainless steel or iron, mixtures of carbon materials and metal fine powders, and conductive oxides such as ITO.

The active material 5, binder and conductive aid are added to a solvent to prepare a slurry. N-methyl-2-pyrrolidone or water, for example, may be used as the solvent.

The slurry containing the active material and binder is coated onto the surface of the positive electrode collector 12 and dried to complete the positive electrode 10 comprising the positive electrode collector 12 and positive electrode active material layer 14, as shown in FIG. 1.

(Method for Producing Negative Electrode)

The negative electrode 20 can be produced by a known method. Specifically, a copper foil or the like may be used as the negative electrode collector 22. The negative electrode active material layer 24 may be one containing a negative electrode active material, a conductive aid and a binder. The conductive aid and binder used may be the same as for the positive electrode.

As examples of negative electrode active materials there may be mentioned particles comprising carbon materials such as graphite, non-graphitizing carbon, graphitizing carbon and low-temperature firing carbon, which are capable of intercalation/deintercalation (or doping/dedoping) of lithium ion, metals that can form compounds with lithium, such as Al, Si and Sn, amorphous compounds composed mainly of oxides such as $SiO_2$ and $SnO_2$, or lithium titanate ($Li_4Ti_5O_{12}$) and the like.

The method for producing the negative electrode 20 may involve preparing a slurry in the same manner as the method for producing the positive electrode 10, and coating it onto a collector.

(Method for Producing Electrochemical Device)

In addition to the positive electrode 10 and negative electrode 20 described above there are also prepared an electrolyte solution, separator 18, case 50 and leads 60, 62.

The electrolyte solution is added to the positive electrode active material layer 14, negative electrode active material layer 24 and separator 18. There are no particular restrictions on the electrolyte solution, and for this embodiment, for example, an electrolyte solution (electrolyte aqueous solution or organic solvent-based electrolyte solution) containing a lithium salt may be used. However, since durable voltage of electrolyte aqueous solutions during charge is limited to low level due to low electrochemical decomposition voltage, it is preferably an organic solvent-based electrolyte solution (non-aqueous electrolyte solution) as electrolyte aqueous solutions. The electrolyte solution is preferably non-aqueous solvent (organic solvent) containing dissolved lithium salt. As examples of lithium salts there may be used salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$ and LiBOB. These salts may be used alone or in combinations of two or more.

As examples of preferred organic solvents there may be mentioned propylene carbonate, ethylene carbonate, diethyl carbonate and dimethyl carbonate. These may be used alone or in combinations of two or more in any desired proportion.

For this embodiment, the electrolyte solution may be a gelatinous electrolyte obtained by adding a gelling agent. An ionic liquid or a solid electrolyte (solid polymer electrolyte or an electrolyte composed of an ionic conductive inorganic material) may be used instead of an electrolyte solution.

The separator 18 may be formed from an electrical insulating porous body, and as examples of the separator 18 there may be mentioned monolayer films and laminated bodies composed of polyethylene, polypropylene or polyolefin, or stretched films comprising resin mixtures, or fiber nonwoven fabrics composed of one or more structural materials selected from the group consisting of cellulose, polyester and polypropylene.

The case 50 has the laminated body 30 and electrolyte solution sealed therein. The case 50 is not particularly restricted so long as it can prevent leakage of the electrolyte solution to the exterior and infiltration of moisture from the exterior into the lithium ion secondary battery 100. For example, the case 50 may be a metal laminate film consisting of a polymer film 54 coated on both sides of a metal foil 52, as shown in FIG. 1. For example, an aluminum foil may be used as the metal foil 52, and a polypropylene or other film may be used as the polymer film 54. The material for the outer polymer film 54 is preferably, for example, a polymer with a high melting point such as polyethylene terephthalate (PET) or polyamide, while the material for the inner polymer film 54 is preferably polyethylene or polypropylene.

The leads 60, 62 are each formed from a conductive material such as aluminum or nickel.

The leads 60, 62 are welded respectively to the positive electrode collector 12 and negative electrode collector 22 according to a known method, insertion into the case 50 with the separator 18 sandwiched between the positive electrode active material layer 14 of the positive electrode 10 and the negative electrode active material layer 24 of the negative electrode 20, injection of the electrolyte solution in the case 50 and finally sealing of the opening of the case 50.

In the first embodiment, second metal oxide particle groups 2 comprising zirconium oxide particles and silicon oxide particles are formed on the surfaces of the first metal oxide particles 1. This will result in improving cycle characteristics compared to the prior art. This is believed to occur because contact of an aqueous solution containing a zirconium fluoro-complex and a silicon fluoro-complex with the first metal oxide particles 1 contributes to formation of not complex oxide particle groups containing zirconium and silicon but zirconium oxide particle and silicon oxide particle groups 2 on the surfaces of the first metal oxide particles 1. This inhibits aggregate of zirconium oxide particles and silicon oxide particles, thus allowing the surfaces of the first metal oxide particles 1 to be more uniformly covered by the second metal oxide particle groups 2, thus resulting in improved cycle characteristics.

(Second Embodiment)

The second embodiment of the invention will now be explained. According to the invention, after the positive electrode 10 comprising the positive electrode active material layer 14 has been produced beforehand using first metal oxide particles 1 before formation of the second metal oxide particle groups 2, the positive electrode 10 is contacted with an aqueous solution containing a zirconium fluoro-complex and silicon fluoro-complex as the metal fluoro-complex to form second metal oxide particle groups 2 comprising zirconium oxide particles and silicon oxide particles on the surfaces of the first metal oxide particles 1 in the positive electrode active material layer 14. That is, the surfaces of the first metal oxide particles 1 in the positive electrode active material layer 14 are modified.

The method for producing the positive electrode 10 is the same as for the first embodiment, except that non-surface-modified first metal oxide particles 1 are used. The aqueous solution comprising the zirconium fluoro-complex and silicon fluoro-complex that is contacted with the positive electrode 10 is also the same as for the first embodiment. The conditions for contact may also be the same as for the first embodiment. Particularly when the positive electrode collector 12 of the positive electrode 10 is Al, the Al functions as a scavenger to promote surface modification. When the Al positive electrode collector 12 is used as a scavenger, the Al is eroded but not to a point that impairs its function as a collector.

In the second embodiment, treatment of the positive electrode 10 modifies the surfaces of the first metal oxide particles 1 in the positive electrode active material layer 14 in the same manner as the first embodiment, to form second metal oxide particle groups 2. This produces the same effect as the first embodiment.

In the embodiment described above, the second metal oxide particle groups 2 are formed on the surfaces of the first metal oxide particles 1 as the positive electrode active material, but if the negative electrode active material particles are of a metal oxide, a similar effect can be obtained by forming the second metal oxide particle groups in the same manner on the first metal oxide particles as the negative electrode active material. For example, a high effect can be obtained when the first metal oxide as the negative electrode active material is a metal oxide such as $Li_4Ti_5O_{12}$, $SnO_x$ ($0<x\leq2$) or $SiO_x$ ($0<x\leq2$).

Furthermore, although the embodiment described above is for a lithium ion secondary battery, the same effect is also exhibited for an electrical double layer capacitor or hybrid electrical double layer capacitor. With an electrical double layer capacitor, for example, a notable effect is obtained when using $RuO_2$ or the like as the active material.

EXAMPLES

Example 1

In a mixed aqueous solution (40° C.) comprising 0.01 M $K_2ZrF_6$ (product of Morita Chemical Industries Co., Ltd.), 0.01 M $(NH_4)_2SiF_6$ (product of Kanto Kagaku Co., Ltd.), 0.05 M $H_3BO_3$ (product of Kanto Kagaku Co., Ltd.) and 1.0 M $LiNO_3$ (product of Kanto Kagaku Co., Ltd.) there was dispersed $LiNi_{0.80}Co_{0.15}Al_{0.05}O_2$ (specific surface area: 0.39 $m^2/g$) over a period of 3 hours. This was filtered and rinsed, and then heat treated in air at 700° C. for 2 hours to obtain a positive electrode active material. The pH of the filtrate was 7.0. Since treatment using an aqueous solution containing a metal fluoro-complex can potentially lower the service capacity as $Li^+$ elutes from $LiNi_{0.80}Co_{0.15}Al_{0.05}O_2$, $LiNO_3$ is added to inhibit elution of $Li^+$.

Figure 3:
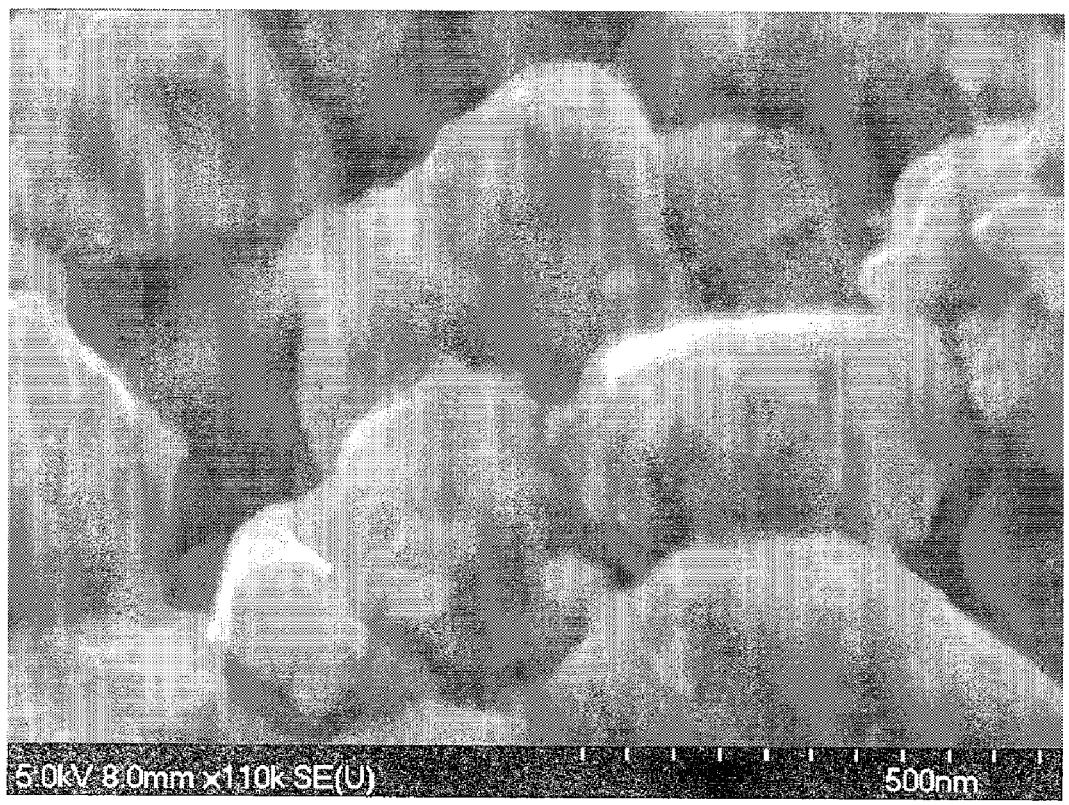
FIG. 3 is an SEM photograph of the active material obtained in Example 1.
Figure 4:
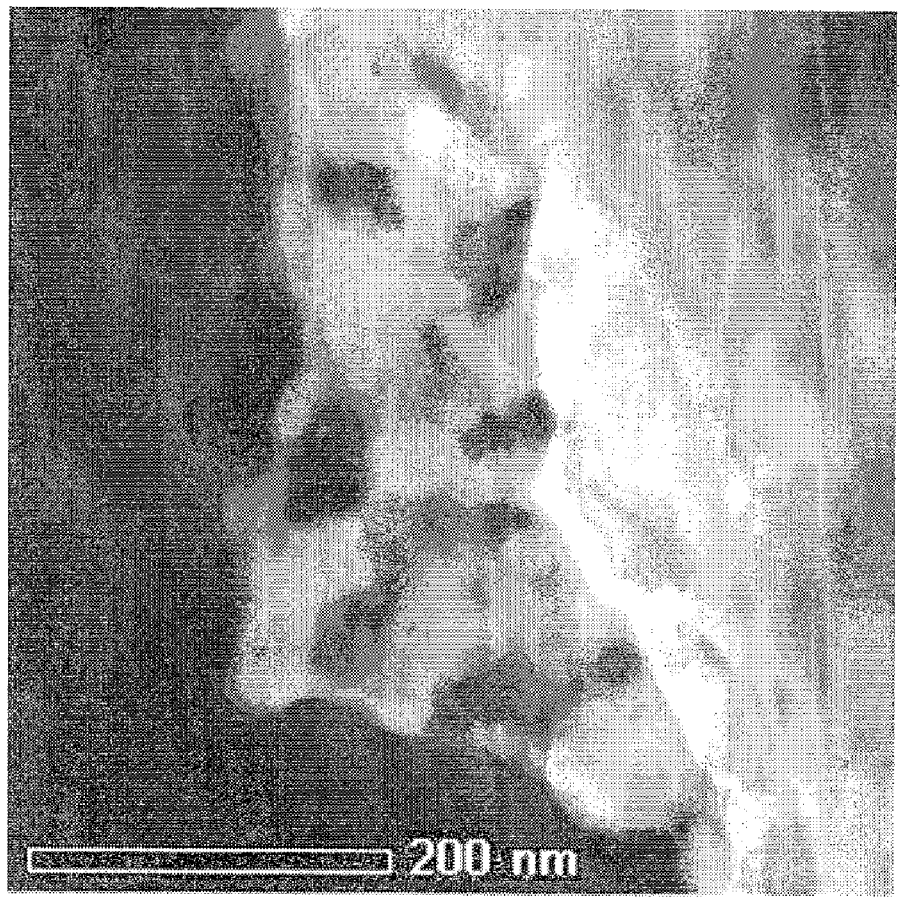
FIG. 4 is a TEM photograph of the active material obtained in Example 1.
Figure 5:
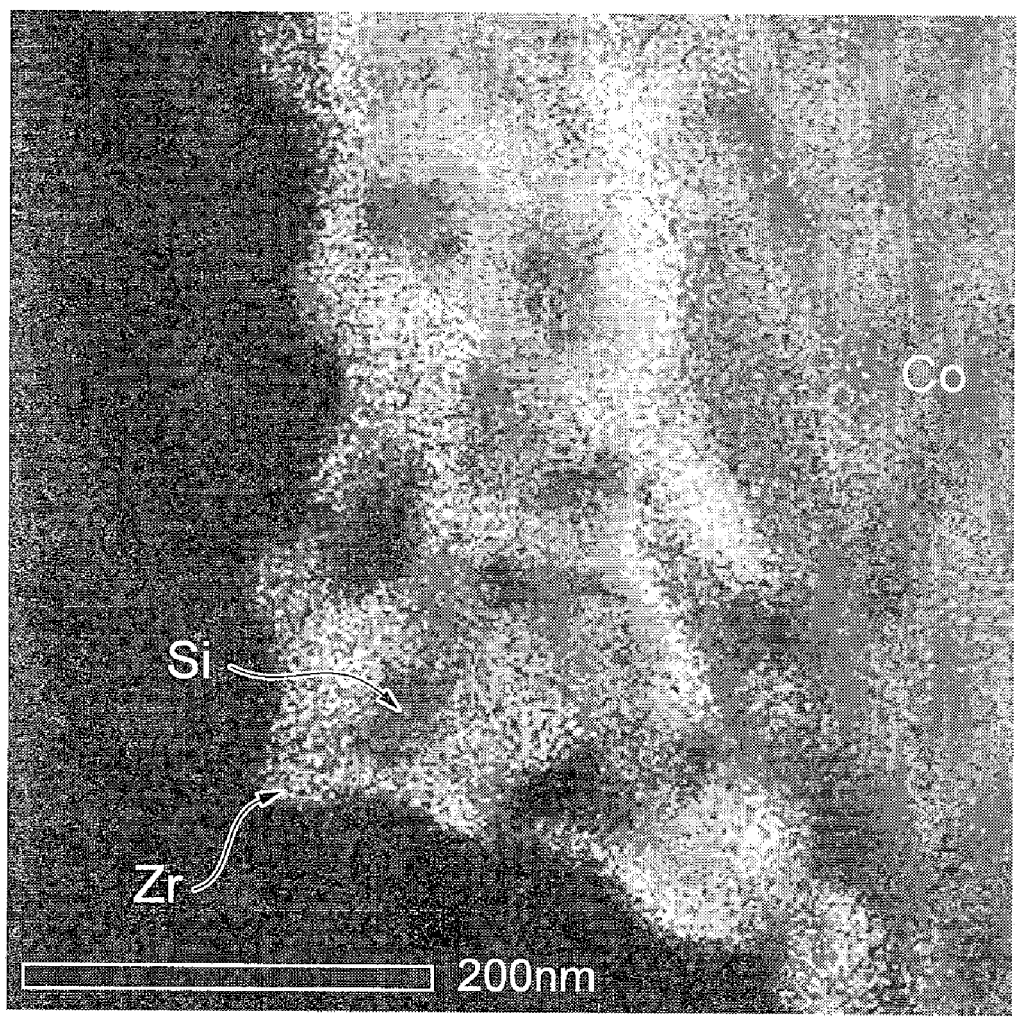
FIG. 5 is an EDS mapping image of the active material obtained in Example 1.

When the positive electrode active material was measured by ICP (inductively coupled plasma emission spectroscopy, ICPS-8000 by Shimadzu Corp.), $ZrO_2$ and $SiO_2$ were present at 0.73% by mass and 0.40% by mass, respectively. When the positive electrode active material was observed by SEM (S-4700 by Hitachi, Ltd.), $ZrO_2$ particles and $SiO_2$ particles were found to be uniformly adhering to the surface of the positive electrode active material particles without aggregation (FIG. 3, 110,000x). There are also shown a TEM photograph (FIG. 4) and EDS mapping image (FIG. 5) of the positive electrode active material. The TEM and EDS measurement were conducted using a JEM-2100F by JEOL Corp. FIGS. 4 and 5 show that the $ZrO_2$ particles and $SiO_2$ particles were not compatible but were present without forming complex oxides.

[Fabrication of Electrode]

A positive electrode was fabricated using 90% by mass of this positive electrode active material, 3% by mass of carbon black and 3% by mass of graphite as conductive aids, and 4% by mass of PVDF as a binder. The positive electrode active material and carbon black were added to an NMP solution containing dissolved PVDF, to fabricate a coating material. After coating the coating material onto a copper foil as the collector (thickness: 16 μm) by doctor blading, it was dried (100° C.) and rolled.

[Fabrication of Cell]

The obtained positive electrode was then laminated with a Li foil (thickness: 100 μm) as the counter electrode, and a polyethylene separator sandwiched between them, to obtain a laminated body (element assembly). The laminated body was placed in an aluminum laminate pack, and after injecting 1 M $LiPF_6$/EC+DEC (30:70, volume ratio) as an electrolyte solution into the aluminum laminate pack, it was vacuum-sealed to fabricate an electrode-evaluating cell 1 (length: 48 mm, width: 34 mm, thickness: 2 mm).

An electrode-evaluating cell 2 (length: 48 mm, width: 34 mm, thickness: 2 mm) was fabricated in the same manner as the electrode-evaluating cell 1, except that graphite was used as the negative electrode.

[Evaluation of Electrical Characteristics]

Regarding the cell characteristics of the electrode-evaluating cell 1, the service capacity was found to be 178 mAh/g upon constant current/constant voltage charge at a charge current of 0.1 C, a charging voltage of 4.3 V ("vs.Li/Li$^+$", same hereunder), followed by discharge to 3.0 V at a discharge current of 0.1 C (nominal capacity=190 mAh/g) at 25° C. In addition, there was conducted constant current charge to 4.5 V at a charge current of 0.1 C at 60° C., followed by constant voltage charge at 4.5 V from the start of charge to 100 hours thereafter, and further discharge to 3.0 V at a discharge current of 0.1 C. The charge-discharge efficiency in this acceleration test was satisfactory at 93%.

To evaluate the cell characteristics of the electrode-evaluating cell 2, there was conducted a cycle of constant current/constant voltage charge at a charge current of 1.0 C and a charging voltage of 4.2 V, followed by discharge to 3.0 V at a discharge current of 1.0 C, at 60° C. The capacity retention after 300 cycles was 93%, with 100% as the initial discharge capacity.

Example 2

The same manner as Example 1 was carried out, except that the concentrations of $K_2ZrF_6$ and $(NH_4)_2SiF_6$ were changed to 0.005 M and 0.015 M, respectively. The pH of the filtrate was 7.0. The $ZrO_2$ and $SiO_2$ contents in the treated positive electrode active material were 0.37% by mass and 0.60% by mass, respectively. The service capacity of the active material in the electrode-evaluating cell 1 was 182 mAh/g. The charge-discharge efficiency in an acceleration test was 94%. The capacity retention after 300 cycles for the electrode-evaluating cell 2 was 95%.

Example 3

The same manner as Example 1 was carried out, except that the concentrations of $K_2ZrF_6$ and $(NH_4)_2SiF_6$ were changed to 0.015 M and 0.005 M, respectively. The pH of the filtrate was 7.0. The $ZrO_2$ and $SiO_2$ contents in the treated positive electrode active material were 1.1% by mass and 0.20% by mass, respectively. The service capacity of the active material in the electrode-evaluating cell 1 was 178 mAh/g. The charge-discharge efficiency in an acceleration test was 92%. The capacity retention after 300 cycles for the electrode-evaluating cell 2 was 94%.

Comparative Example 1

Figure 6:
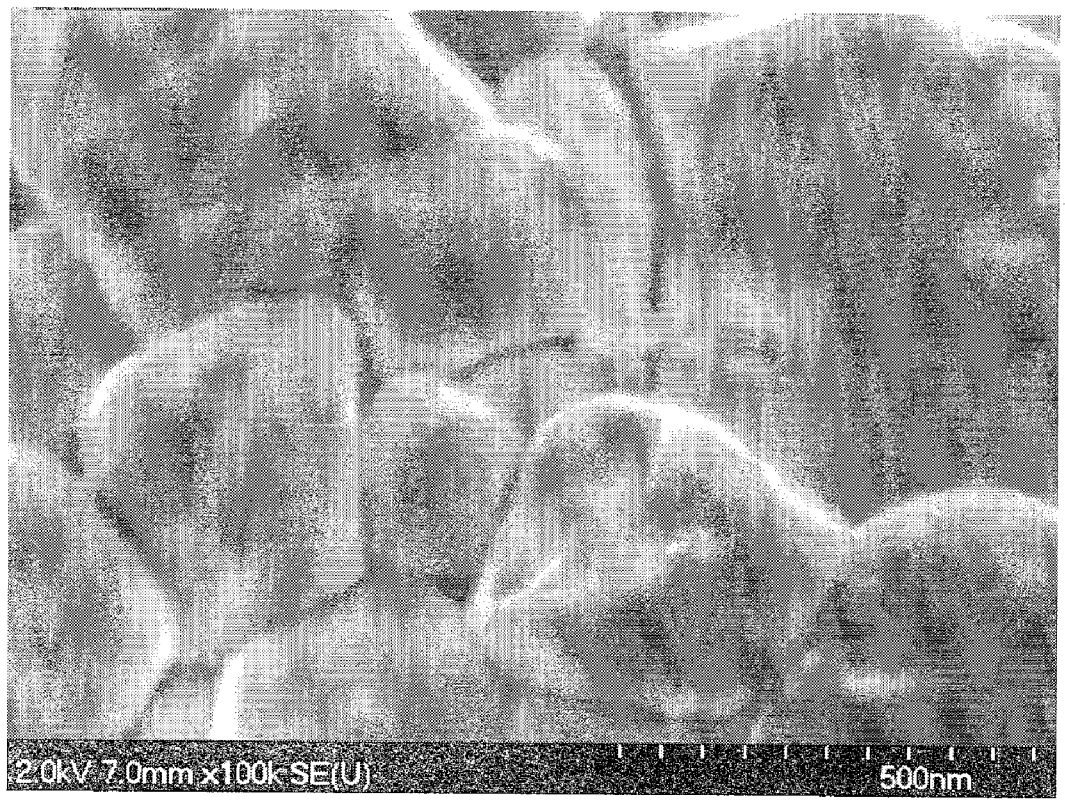
FIG. 6 is an SEM photograph of the active material obtained in Comparative Example 1.

The same manner as Example 1 was carried out, except that $LiNi_{0.80}Co_{0.15}Al_{0.05}O_2$ was used as the positive electrode active material without treatment with a metal fluoro-complex. FIG. 6 shows an SEM photograph for observation of the positive electrode active material by the same method as Example 1. The service capacity of the active material in the electrode-evaluating cell 1 was 178 mAh/g. The charge-discharge efficiency in an acceleration test was 80%. The capacity retention after 300 cycles for the electrode-evaluating cell 2 was 63%.

Comparative Example 2

Figure 7:
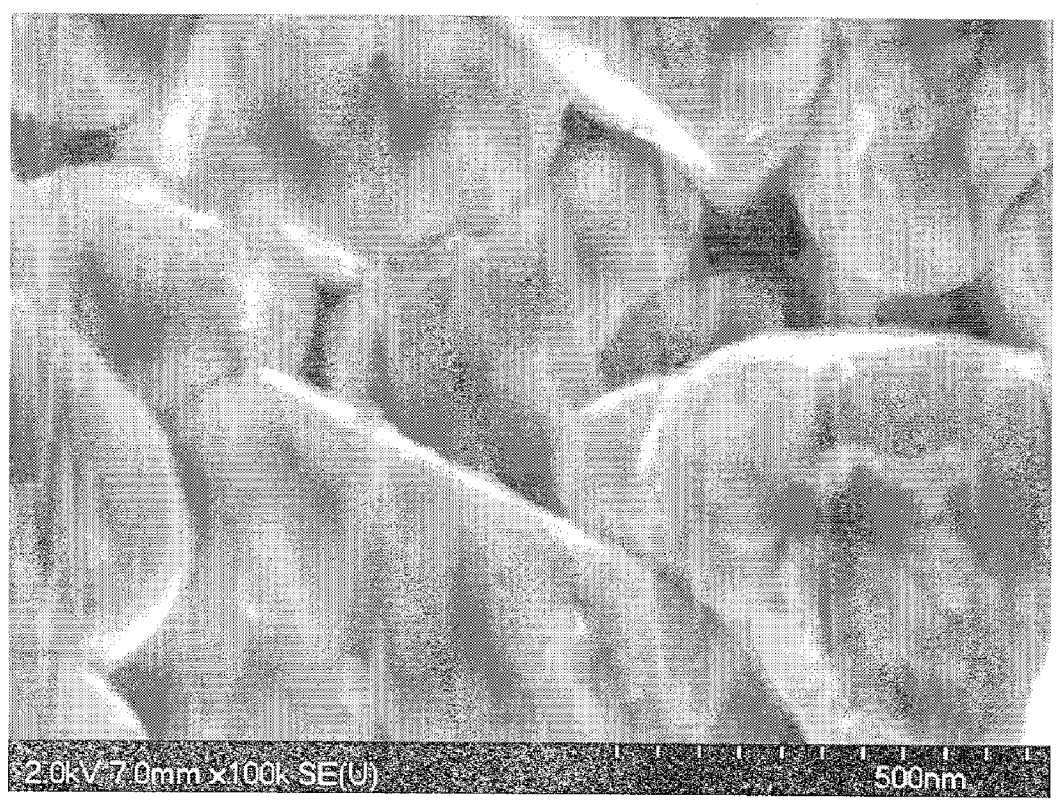
FIG. 7 is an SEM photograph of the active material obtained in Comparative Example 2.
Figure 8:
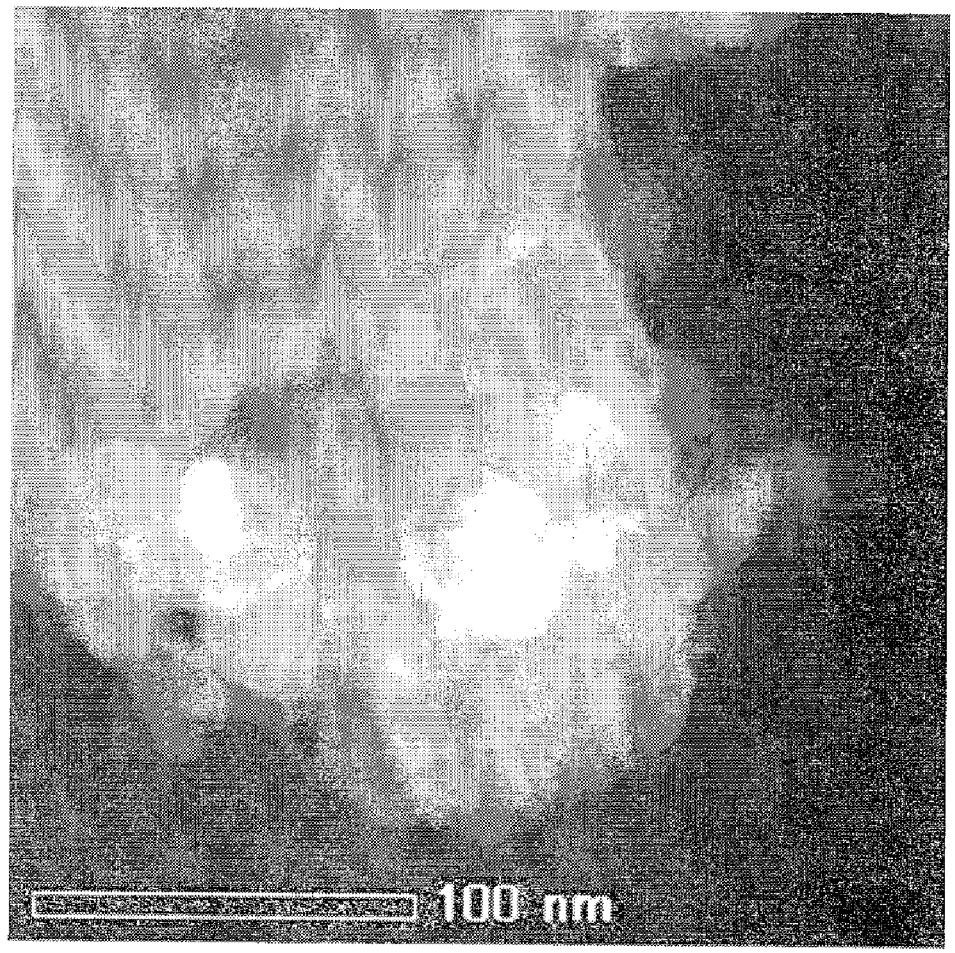
FIG. 8 is a TEM photograph of the active material obtained in Comparative Example 2.
Figure 9:
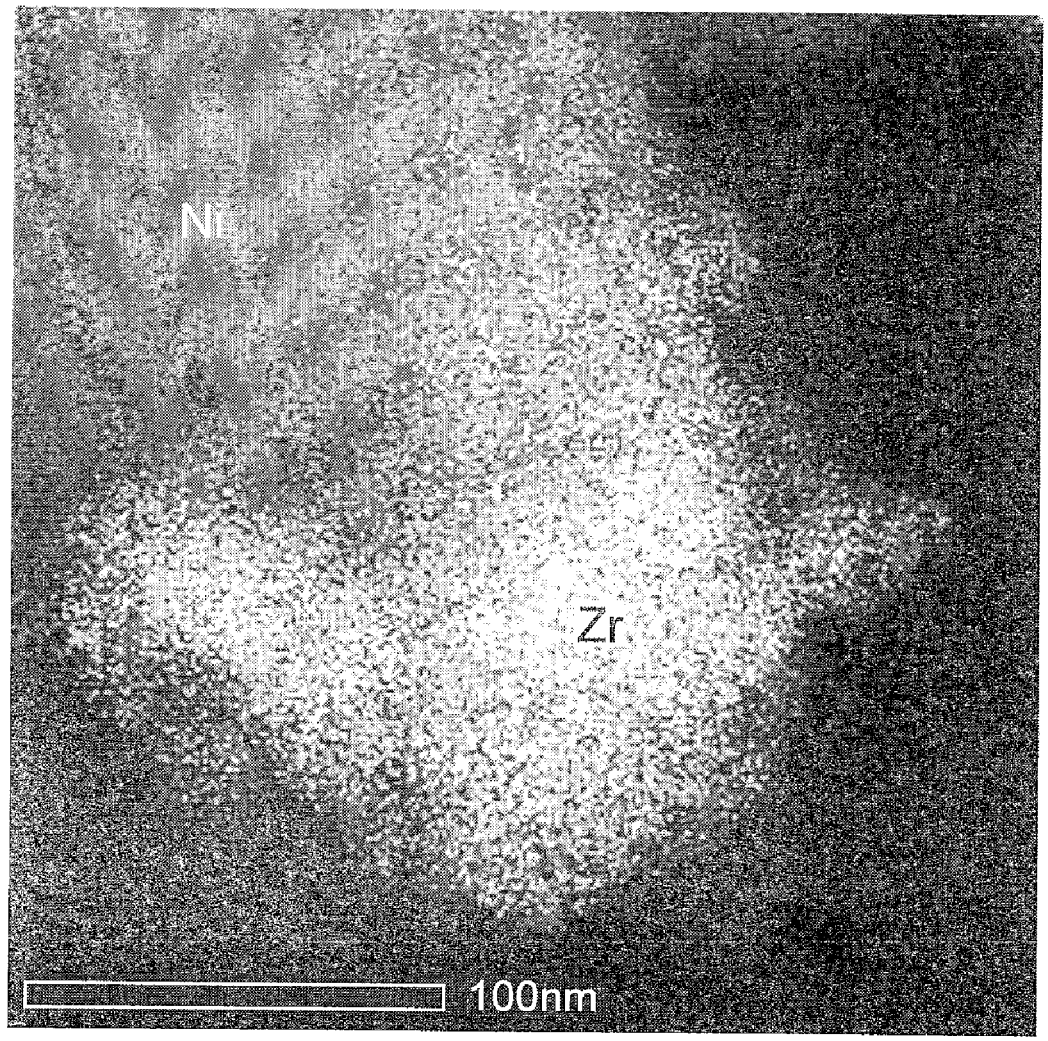
FIG. 9 is an EDS mapping image of the active material obtained in Comparative Example 2.

The same manner as Example 1 was carried out, except that only $K_2ZrF_6$ was used as the metal fluoro-complex. The pH of the filtrate was 11.4. The $ZrO_2$ content in the treated positive electrode active material was 0.81% by mass. FIG. 7 shows an SEM photograph for observation of the positive electrode active material by the same method as Example 1. FIG. 7 shows that the $ZrO_2$ particles had aggregated, resulting in greater area of exposure of the $LiNi_{0.80}Co_{0.15}Al_{0.05}O_2$ particles. There are shown a TEM photograph (FIG. 8) and EDS mapping image (FIG. 9) of the positive electrode active material. FIGS. 8 and 9 show that the $ZrO_2$ particles had aggregated as approximately 100 nm masses. The service capacity of the active material in the electrode-evaluating cell 1 was 178 mAh/g. The charge-discharge efficiency in an acceleration test was 83%. The capacity retention after 300 cycles for the electrode-evaluating cell 2 was 80%.

Tables 1 and 2 show the results of evaluating the active materials, oxide contents and cell characteristics for Examples 1-3 and Comparative Examples 1-2.

TABLE 1

| | | \multicolumn{7}{c}{LPD production conditions} | | \multicolumn{3}{c}{Oxide content} |
| | Adhered oxide | $K_2ZrF_6$ (M) | $(NH_4)_2SiF_6$ (M) | $H_3BO_3$ (M) | $LiNO_3$ (M) | Reaction temperature (° C.) | Reaction time (h) | Filtrate pH | Heat treatment temperature (° C.) | $ZrO_2$ (% by mass) | $SiO_2$ (% by mass) | $ZrO_2/(ZrO_2 + SiO_2)$ * 100(%) |
|---|---|---|---|---|---|---|---|---|---|---|---|---|
| Example 1 | $ZrO_2/SiO_2$ | 0.01 | 0.01 | 0.05 | 1.0 | 40 | 3 | 7.0 | 700 | 0.73 | 0.40 | 64.6 |
| Example 2 | | 0.005 | 0.015 | 0.05 | 1.0 | 40 | 3 | 7.0 | 700 | 0.37 | 0.60 | 38.1 |
| Example 3 | | 0.015 | 0.005 | 0.05 | 1.0 | 40 | 3 | 7.0 | 700 | 1.1 | 0.20 | 84.6 |
| Comp. Ex. 1 | None | | | | | | | | | | | |
| Comp. Ex. 2 | $ZrO_2$ | 0.01 | | 0.05 | 1.0 | 40 | 3 | 11.4 | 700 | 0.81 | | 100 |

TABLE 2

| | Cell 1 | | Cell 2 |
| | Discharge capacity (mAh/g) | Charge-discharge efficiency in acceleration test (%) | Capacity retention (%) |
|---|---|---|---|
| Example 1 | 178 | 93 | 93 |
| Example 2 | 182 | 94 | 95 |
| Example 3 | 178 | 92 | 94 |
| Comp. Ex. 1 | 178 | 80 | 63 |
| Comp. Ex. 2 | 178 | 83 | 80 |

What is claimed is:

1. An active material comprising:
   a first metal oxide particle; and
   a second metal oxide particle group formed on the surface of the first metal oxide particle, wherein
   the second metal oxide particle group contains a zirconium oxide particle and a silicon oxide particle, the second metal oxide particle group forms a layer having a thickness of 1-200 nm on the surface of the first metal oxide particle, and a mass ratio of the zirconium oxide particle with respect to a total mass of the zirconium oxide particle and silicon oxide particle in the second metal oxide particle group is from 11% to 38.1%.

2. An electrode comprising the active material according to claim 1.

3. The active material according to claim 1, wherein a first metal oxide of the first metal oxide particle is $LiNi_xCo_yAl_{1-x-y}O_2$, where x and y are greater than 0 and less than 1.

* * * * *